July 26, 1960 W. J. BROWN ET AL 2,946,852

AUTOMATIC TELEPHONE ANSWERING AND MESSAGE-RECORDING SYSTEM

Filed April 2, 1958 5 Sheets-Sheet 1

INVENTORS W.J. BROWN
R.A. MILLER
C.M. TARIS

BY V. P. Priolo

ATTORNEY

July 26, 1960 W. J. BROWN ET AL 2,946,852
AUTOMATIC TELEPHONE ANSWERING AND
MESSAGE-RECORDING SYSTEM
Filed April 2, 1958 5 Sheets-Sheet 2

W.J. BROWN
INVENTORS R.A. MILLER
C.M. TARIS
BY V. P. Priolo
ATTORNEY

July 26, 1960 W. J. BROWN ET AL 2,946,852

AUTOMATIC TELEPHONE ANSWERING AND MESSAGE-RECORDING SYSTEM

Filed April 2, 1958 5 Sheets-Sheet 3

INVENTORS W.J. BROWN
R.A. MILLER
C.M. TARIS

BY V. P. Priolo

ATTORNEY

July 26, 1960 W. J. BROWN ET AL 2,946,852

AUTOMATIC TELEPHONE ANSWERING AND MESSAGE-RECORDING SYSTEM

Filed April 2, 1958 5 Sheets-Sheet 4

INVENTORS W. J. BROWN
R. A. MILLER
C. M. TARIS

BY V. P. Priolo

ATTORNEY

INVENTORS W.J. BROWN
R.A. MILLER
C.M. TARIS
BY V. P. Briolo
ATTORNEY

United States Patent Office 2,946,852

Patented July 26, 1960

2,946,852

AUTOMATIC TELEPHONE ANSWERING AND MESSAGE-RECORDING SYSTEM

William J. Brown, Madison, Robert A. Miller, Plainfield, and Charles M. Taris, Cranford, N.J., assignors to Bell Telephone Laboratories, Incorporated, New York, N.Y., a corporation of New York Filed Apr. 2, 1958, Ser. No. 725,941

28 Claims. (Cl. 179—6)

Figure 1:
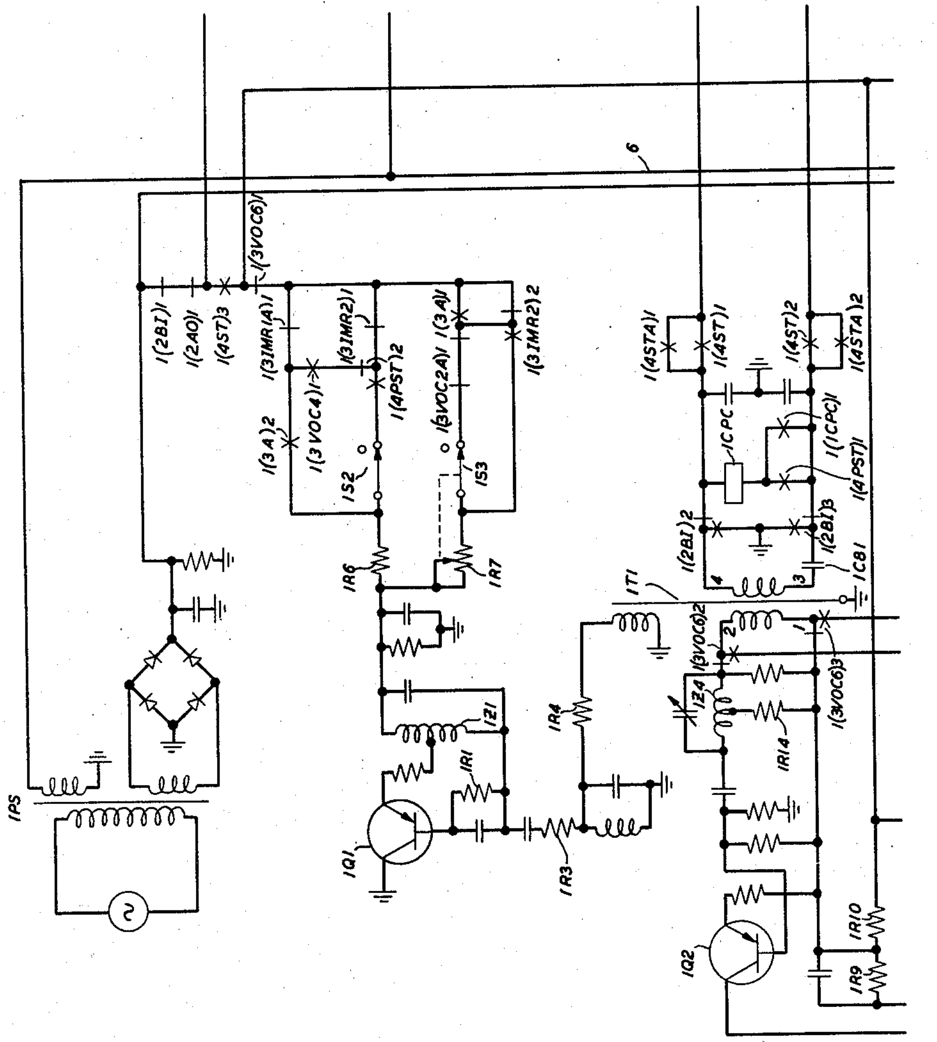

This invention relates to automatic telephone answering and message-recording systems comprising apparatus adapted to be connected to a subscriber's telephone line for the purpose of automatically receiving and transmitting messages during the absence of the subscriber, and particularly to systems of this type which comprise facilities for terminating the incoming message-recording cycle by command from a control unit which senses calling party disconnect by absence of speech on the telephone line for a predetermined length of time or by interruption of telephone line current.

An object of this invention is to provide a telephone answering and message-recording system in which the length of the incoming message is determined by the caller, and is limited only by the maximum capacity of the record medium of the incoming message recorder.

Another object of this invention is to provide a telephone answering and message-recording system which includes facilities for providing the caller with aural indications when he pauses for a predetermined length of time, to indicate that he is still connected to the message-recording system, when the level of his incoming message is below an acceptable minimum amplitude and when he is to be disconnected from the incoming message recorder as a consequence of low speech level, absence of speech or trouble in the message recording system. The aural indications are in the forms of steady-state audio frequency tone, tone beeps and playback of the last part of the message-recording.

A further object of this invention is to provide a telephone answering and message-recording system which includes facilities for enabling the subscriber to monitor the telephone line at any time without interrupting automatic operation, to break in on a call during automatic answering and during the recording of the incoming message, and to originate a call and the subsequent automatic incoming message-recording cycle.

In accordance with this invention, the above-noted objectives are satisfactorily met by a system comprising an automatic telephone answering set of the type disclosed in patent application Serial No. 493,722, filed by C. R. Keith, C. A. Nickerson and C. M. Taris on March 11, 1955, now U.S. Patent 2,846,505, issued August 5, 1958, an incoming message recorder of the dictating machine type produced for commercial use by a number of manufacturers, and a control unit by means of which the components of the system are tied together and connected to the subscriber's telephone line.

The features of the invention reside primarily in the control unit which contains all the equipment necessary to integrate the other components into the system and to connect them to the telephone plant. Besides relay control circuits, the control unit contains a warning-tone oscillator, telephone line speech amplifiers and voice-operated calling party disconnect facilities. The voice-controlled circuits of the control unit are energized directly by speech on the telephone line.

An incoming call activates the telephone answering set and the pre-recorded announcement is transmitted to the caller in the normal manner. At the end of the announcement, the control unit (referred to hereinafter as CU) switches the caller to the incoming message recorder (referred to hereinafter as IMR). At the same time the CU puts a single, high level, 1400-cycle, beep (about ½ second in duration) on the telephone line, followed immediately by a constant amplitude, low level, 1400-cycle tone.

The caller's message is recorded by the IMR. If he speaks loudly enough, the constant amplitude tone (the talk-down tone) will disappear completely. If he pauses for more than about two seconds or his voice drops below a certain level, the talk-down tone reappears on the telephone line. The caller is instructed by the announcement or has previous knowledge that in order to leave an acceptable message he must talk down the tone. The talk-down tone also serves as an aural indicator for the caller. It informs him that he is still connected to the IMR and that the recording process is still operative.

If the caller ceases speaking for an interval more than about ten seconds long (the last eight seconds of which will have talk-down tone), a series (four or more) of high level, 1400-cycle beeps will be transmitted to him by the CU. After this warning beep interval of about five seconds, the talk-down tone reappears for an additional two seconds. Unless the caller speaks before this time-out cycle of about seventeen seconds is completed, the CU will disconnect from the telephone line. By speaking a word or two the caller may interrupt the time-out cycle at any time, even during the warning beep interval. Once the time-out cycle is interrupted it reverts to its starting point.

The CU will time out a call on the basis of whether or not speech, at adequate level, is present on the telephone line. Control is achieved by using the syllabic frequency of normal speech (below about ten cycles per second) rather than the audio frequencies. The caller's speech is amplified and rectified. The audio components of the rectified speech are then filtered and the syllabic modulation components (sub-audio components) of the speech transmission, corresponding to syllables, words, groups of words and pauses between them, are used to energize relays which control the time-out and tone talk-down facilities. The voice control used in this system avoids false operation due to power line noise, dial tone and the like because of its inherent insensitivity to steady-state audio frequencies. The voice control is also made insensitive to telephone line clicks and transients.

The subscriber can interrupt the IMR recording cycle. He may talk to the caller and then reestablish the IMR recording cycle. As a consequence of this break-in feature, the subscriber can originate a call and, after the called party responds, start the operation of the IMR. The IMR recording cycle will proceed as it would have if the called party had originated the call.

The subscriber has the option of placing the system into an answer-only condition whereby an announcement is transmitted but no incoming message is recorded. Also, the CU has an optional ring-up circuit which may be used in place of the ring-up circuit of the telephone answering set in installations where the subscriber does not need an announcement to precede the IMR recording cycle.

The subscriber is able to change the announcement of the answering set during the time the IMR is recording an incoming message as well as during the inactive intervals of the system between incoming calls.

The CU will provide pulses corresponding to the intervals, in the recording cycle, during which speech is absent for more than two seconds. The IMR may use these signals to stop and start its record medium and thereby conserve recording material.

The CU also has facilities that enable it to recognize the operating status of the IMR and the telephone answering set. Unless the IMR is pre-set for the record function and has sufficient recording time remaining on the recording medium for a minimum incoming-message recording, the incoming call will not be accepted and unless the answering set is pre-set for automatic answer, the caller will receive a don't answer indication. In addition, the CU will recognize a change in operating status of the IMR during the message-recording cycle and disconnect the caller from the system after transmitting a disconnect signal to him. Other disconnect signals are also generated by the CU to notify the caller when the end of IMR recording time is approaching and when the recording medium is exhausted.

Figure 5:
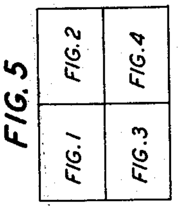
Figure 2:
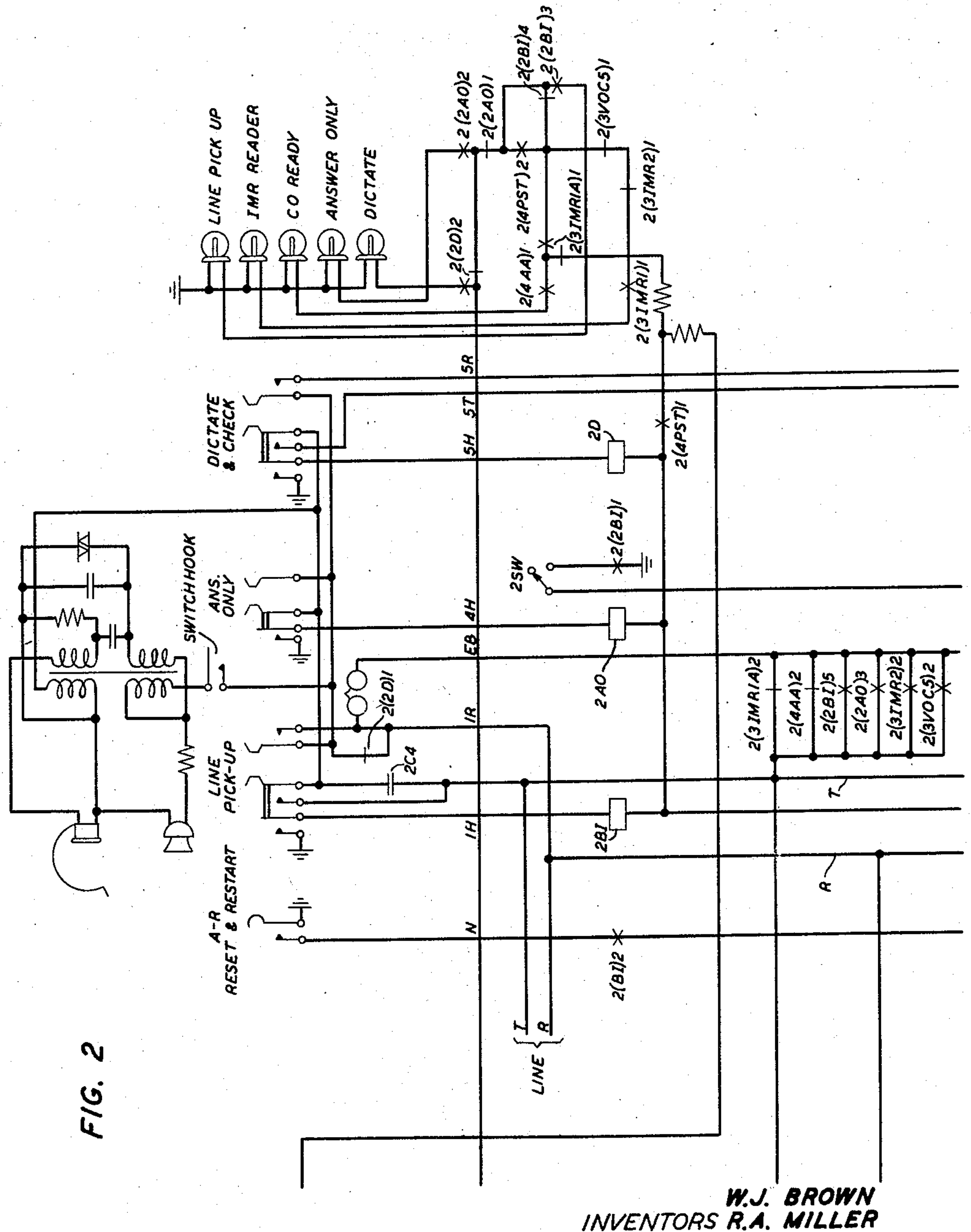
Figure 3:
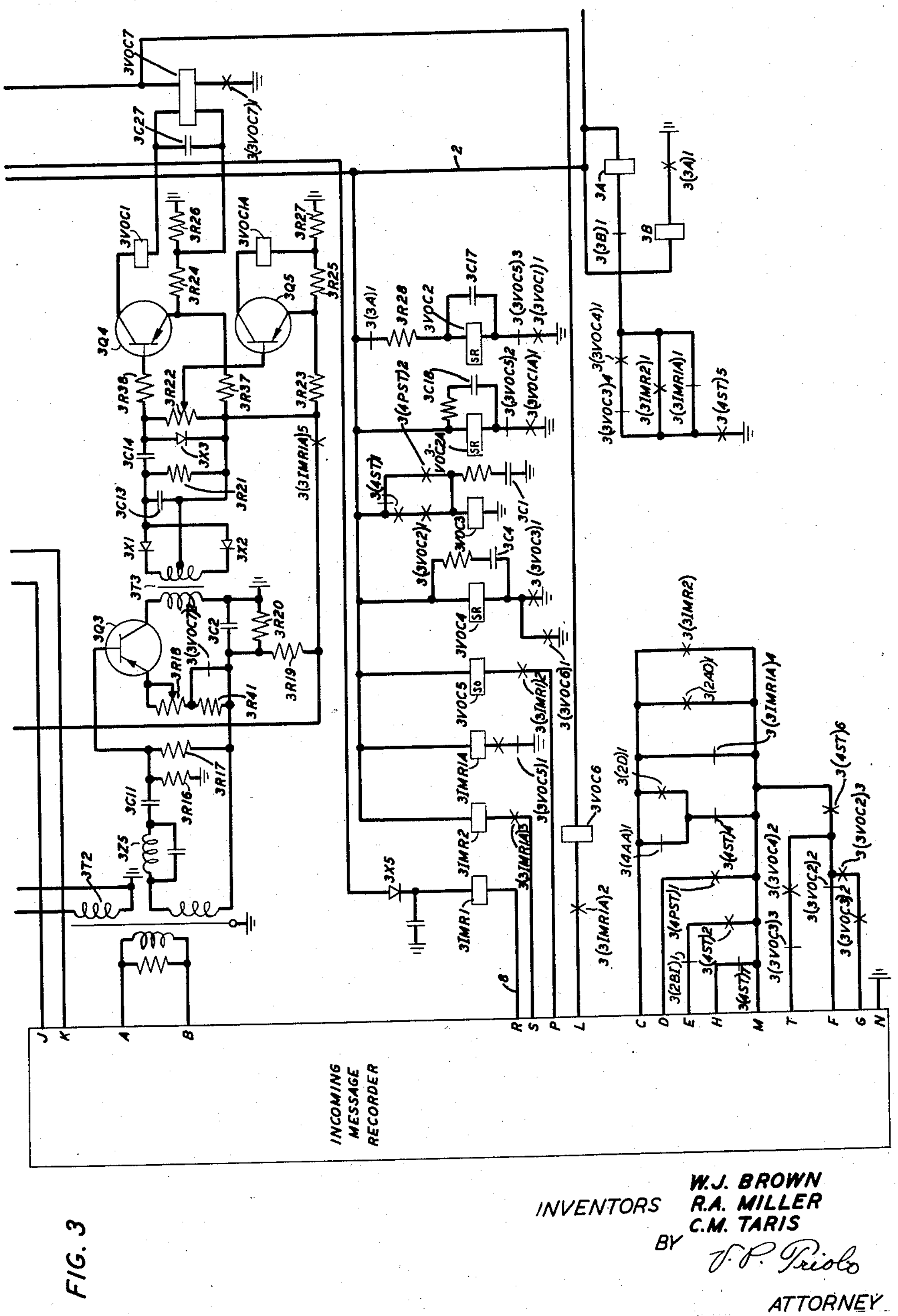
Figure 4:
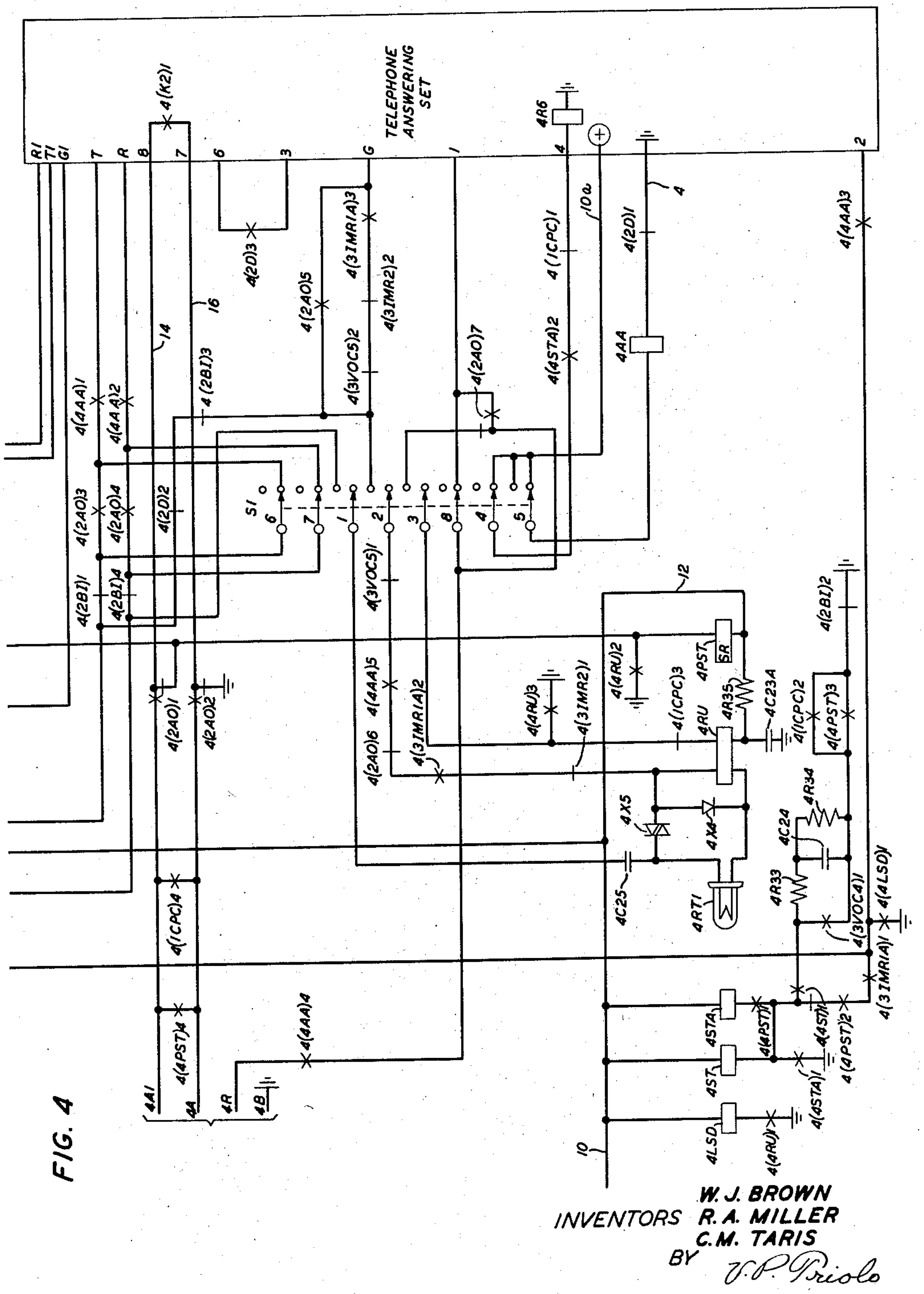
Figure 6:
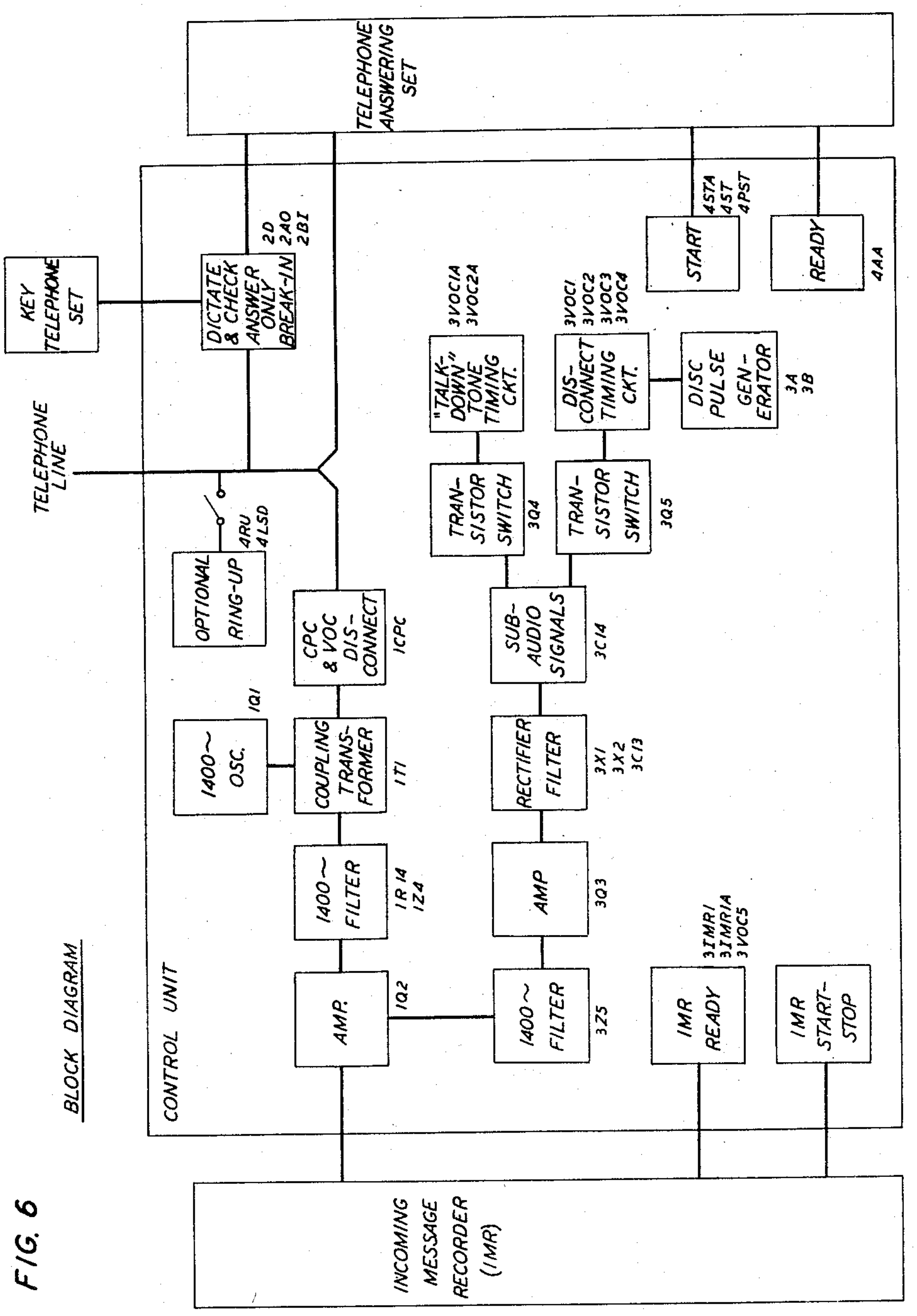

The nature of the invention and its distinguishing features and advantages will be more clearly understood from the following detailed description and the accompanying drawings in which:

Figs. 1, 2, 3 and 4, when assembled as indicated in Fig. 5, constitute a diagrammatic disclosure of the preferred embodiment of the invention, showing the control unit and the interconnections between the units of the system. Fig. 6 is a block diagram of the invention.

In the drawings, the relay contacts are shown detached from the relay windings. The first digit of each reference number indicates the figure in which it appears and the letters indicate the function thereof. Relay 4PST, for example, is the pre-start relay and appears in Fig. 4. The designation of the contact of a relay includes in parentheses the relay reference number with the first digit before the parentheses indicating the figure in which the contact appears. Contacts 1(4PST)1 and 1(4PST)2, for example, appear in Fig. 1 and are contacts of the prestart relay PST which appears in Fig. 4. Contacts which are closed when the relay is operated are represented by an "X" crossing lines representing the connecting conductors. Contacts which are opened when the relay is operated are represented by a "—."

With the telephone answering set in automatic answer standby condition and its power supply 1PS activated, the CU relay 4AA is operated by voltage (48 volts) supplied over the path including conductor 10A, switch 4S1, closed contact 4(2D)1 of relay 2D and conductor 4 connected to ground. The operation of relay 4AA completes the CU telephone line circuit to the telephone answering set over the path including conductor T, closed contact 4(2BI)1, of relay 2BI, switch 4S1 and operated contact 4(4AA)1 of relay 4AA, and the path including conductor R, 4(2BI)3 switch 4S1 and operated contact 4(4AA)2 of relay 4AA. Operation of relay 4AA also opens the telephone set ringer circuit (not shown) and closes contact 4(4AA)3 in the operate circuit of start relays 4ST and 4STA.

With the IMR in condition for recording (power applied, record function enabled, recordings are driven in position, minimum recording capacity available, etc.) relay 3IMR1 is operated by rectified voltage supplied over the path which includes the alternating current output winding of power supply 1PS, conductor 6, rectifier 3X3 and conductor 8 connected to ground. Operation of relay 3IMR1 closes the operate path of relay 3IMR1A, said path including power supply 1PS, conductor 2, operated contact 3(3IMR1)1 of relay 3IMR1 and closed contast 3(3VOC5)1 of voice control relay 3VOC5.

With the answer and record condition established the system is ready to accept an incoming call. The subscriber's telephone line is connected to the telephone answering set via the CU, and ringing current will go directly to the set ring-up circuit over the path described heretofore. Ring-up relay K2 (not shown) of the telephone answering set responds to the ringing current and operates contact 4(K2)1 to close the operate path of pre-start relay 4PST. Relay 4PST is operated by voltage supplied over the path to ground which includes conductors 2, 10 and 12, closed contact 4(2AO)1 of relay 2AO, conductor 14, contact 4(K2)1 of relay K2, conductor 16 and closed contact 4(2AO)2 of relay 2AO.

Operation of relay 4PST pre-sets the 1MR and CU for the incoming message-recording cycle. Operated contact 3(4PST)1 closes a circuit to terminals D and M of the 1MR which can be used to warm up its amplifier, start the drive motor, and the like. Also, operated contact 3(4PST)2 causes the timing capacitor 3C1 of voice operated relay 3VOC3 to charge fully and closes the operate circuit of relay 3VOC3. Relay 3VOC3 is operated by voltage provided over the path which includes closed contact 3(4ST)1 of start relay 4ST. Operated contact 3(3VOC3)1 of relay 3VOC3 causes relay 3VOC4 to operate and timing capacitor 3C2 to charge fully.

About 3½ seconds after the start of ringing current the telephone answering set seizes the telephone line and the pre-recorded announcement is transmitted to the caller. At the end of the announcement, a contact on the adjustable limit switch (not shown) of the telephone answering set closes momentarily. This closure puts ground on terminal 2 of the telephone answering set. Relay 4STA is then operated by ground provided over the path which includes operated contact 4(4PST)1 of relay 4PST, closed contact 4(4ST)1 of relay 4ST operated contact 4(4PST)2 of relay 4PST, operated contact 4(3IMR1A)1 of relay 3IMR1A and operated contact 4(4AA)3 of relay 4AA. Operated contact 4(4STA)1 of relay 4STA closes the operate path for relay 4ST. Operated contact 3(4ST)1 and closed contact 3(2BI)1 completes the start and disconnect signal circuit to terminals E and M of the IMR. The IMR record medium is put into motion and the recording cycle starts.

Operated contact 4(4STA)2 of relay 4STA closes the operate path of "telephone line holding" relay K6 of the telephone answering set. Relay K6 remains operated and the telephone answering set continues to hold the telephone line although the remainder of the set is restored to standby condition. The delay in allowing the answering set to drop off the line is necessary in order to give the CU time to seize the line and take over line holding. Operated contacts 1(4STA)1 and 1(4STA)2 of relay 4STA bridge calling party control relay 1CPC across the telephone line. Relay 1CPC operates through operated contact 1(4PST)1 and seizes the telephone line. Operation of relay 1CPC causes contact 4(1CPC)1 to open. Relay K6 is thereby deenergized and the answering set immediately drops off the telephone line. On operation of relay 4ST contacts 1(4ST)1 and 1(4ST)2 also bridge relay 1CPC across the line.

A high level, 1400-cycle tone beep now appears on the telephone line. This is the caller's start signal. The duration (½ to 1 second) of the beep is controlled primarily by the release time of relay 4PST. The tone generator comprising transistor 1Q1 is energized by voltage supplied to the emitter terminal over the path including closed contacts 1(2BI)1 and 1(2AO)1, operated contact 1(4ST)3, closed contacts 1(3VOC6)1 and 1(3IMR2)1, operated contact 1(4PST)2, switch 1S2 and resistor 1R6. The amplitude of the start beep is controlled principally by resistors 1R1, 1R3 and 1R6. Switch S2 is provided so that the start beep may be disabled when the appearance of talk-down tone is sufficient signal for the caller to start talking.

With the answering set off the line and relay K2 deenergized, contact 4(K2)1 opens to deenergize relay 4PST. Relay 4PST releases slowly. Contact 1(4PST)2 opens to stop the start beep. The talk-down tone which is masked by the start beep now appears on the telephone line. The tone is controlled by resistor 1R7 which is in the tone generator energizing path including closed contacts 1(2BI)1, 1(2AO)1 and 1(3VOC6)1 operated contact 1(4ST)3 and closed contacts 1(3IMR2)2, 1(3A)1 and 1(3VOC2A)1 and switch 1S3. The release of relay 4PST also locks relay 4ST over the path including operated contact 4(4ST)1, resistors 4R33 and 4R34, operated contact 4(1CPC)2 and closed contact 4(2BI)2; removes the prestart signal from the 1MR at terminals D and M; releases relay 4STA and places time out relays 3VOC3 and 3VOC4 under direct control of the voice-operated circuits. Relay 1CPC remains connected across the telephone line through its operated contact 1(1CPC)1 and operated contacts 1(4ST)1 and 1(4ST)2 of relay 4ST.

The appearance of talk-down tone on the telephone line is a signal for the caller to start talking. As already noted, the amplitude of this steady-state 1400-cycle tone is controlled by resistor 1R7. A tone amplitude of approximately —25 dbm measured at the T and R terminals of the CU has been found to be satisfactory. Network 1Z2 of the tone and beep generator section serves to by-pass the harmonics of the 1400-cycle tone which could be high enough in level to operate the voice-operated control circuits erroneously during transmission of the disconnect beeps (described hereinafter). The voice-operated circuits will not respond to the steady-state talk-down tone since they are sensitive only to signals which vary in amplitude at a very low rate, below approximately ten cycles per second. (For interrupted tone the 1400-cycle is eliminated from voice control circuits.) The talk-down tone will remain on the telephone line until the caller starts to talk. If his speech level is above —35 v.u., measured at CU terminals T and R, the tone will stop.

The caller's speech reaches transformer 1T1 of the CU via operated contacts 1(4ST)1 and 1(4ST)2 and closed contacts 1(2BI)2 and 1(2BI)3. Capacitor 1C8 is provided to prevent telephone line current from flowing through winding 3—4 of transformer 1T1. The talk-down tone oscillator comprising transistor 1Q1 is also coupled to the telephone line by means of transformer 1T1. Before the caller's speech reaches the IMR input terminals A and B it is amplified by the amplifier comprising transistor 1Q2. The caller's speech is further amplified by the amplifier comprising transistor 3Q3.

The amplified speech is rectified by varistors 3X1 and 3X2. Capacitor 3C13 filters the audio components of the rectified speech. The sub-audio components of the speech transmission, corresponding to syllables, words or groups of words and pauses between them, charge capacitor 3C14 but allows it to discharge through 3X3, 3R22 and 3R21. Transistors 3Q4 and 3Q5 are biased to cut-off in the absence of a charging current to 3C14. When the voltage across 3R22, due to the charging current, reaches a predetermined value, collector current starts to flow. The transistor circuit parameters are so chosen that maximum collector current flows for a slight increase in voltage across 3R22 beyond the base-emitter bias voltage established by 3R23 and 3R37. Resistor 3R18 is adjusted so that the collector current of transistor 3Q4 is sufficient to operate relay 3VOC1 when the speech level at terminals T and R just exceeds —45 v.u. The operate time of the entire speech control sequence, from terminals T and R to 3VOC1, is less than approximately 25 milliseconds. This is substantially independent of input level. Resistor 3R22 is adjusted so that the collector current of transistor 3Q5 is sufficient to operate relay 3VOC1A when the speech level at terminals T and R just exceeds —35 v.u. The operate time is substantially the same as for the 3Q4 sequence. The value of —35 v.u. was chosen arbitrarily for the embodiment being described. Resistor 3R22 can be adjusted to operate relay 3VOC1A at speech levels in excess of —45 v.u. to about —25 v.u. The voltage dividers, 3R24/3R26 and 3R25/3R27, serve to keep the collector-emitter voltage of 3Q4 and 3Q5 below the rated maximum value. Operate circuit of relay 3VOC2 has slow-operate characteristics (about 75 milliseconds). This makes it relatively insensitive to transient pulses such as could occur at the instant of caller hang-up. False operation of the CU time-out circuits is thereby avoided.

The caller starts to speak as soon as he hears the talk-down tone. (The 1400-cycle tone and beeps are attenuated by the filter comprising network 1Z4 and 1R14 and by network 3Z5 so that they will be apparent at terminals T and R but not at IMR input terminals A and B or the voice-control circuits.) Let us assume that the caller's speech level at terminals T and R is approximately —25 v.u. About 25 milliseconds after he starts to speak relays 3VOC1 and 3VOC1A operate. With contacts 3(3VOC1)1 and 3(3VOC1A)1 operated, relays 3VOC2 and 3VOC2A operate shortly thereafter. Normally closed contact 1(3VOC2A)1 opens the power supply to the tone oscillator and talk-down tone stops. Operated contact 3(3VOC2)1 causes capacitor 3C1 to recharge across the winding of relay 3VOC3, and energizes relay 3VOC3. The time-out cycle is restored to its start condition. As long as the caller continues to speak at a level (at terminals T and R) above —35 v.u., both relays 3VOC2 and 3VOC2A will remain operated. Relays 3VOC1 and 3VOC1A will chatter, that is, operate and release in response to words and pauses of sufficient duration. Relays 3VOC2 and 3VOC2A will not follow relays 3VOC1 and 3VOC1A because of their long release time of approximately two seconds. This time is independent of speech level. Operated contacts 3(3VOC1)1 and 3(3VOC1A)1 charge capacitors 3C17 and 3C18 very rapidly but must remain open for more than two seconds in order for these capacitors to discharge enough to release relays 3VOC2 and 3VOC2A. While relays 3VOC2 and 3VOC2A are operated the talk-down tone is off; the time-out circuits are fully charged (relay 3VOC3 and 3VOC4 are operated). The IMR is notified of these conditions by the opening of circuit MF at contact 3(3VOC2)2 and the closing of circuit MG at contacts 3(3VOC2)3 and 3(3VOC3)2.

If the caller's level drops to a value below —35 v.u., but remains above —45 v.u., relay 3VOC1 stays operated but relay 3VOC1A releases immediately. About two seconds later relay 3VOC2A releases, energizing the tone oscillator; talk-down tone appears on the telephone line. The presence of talk-down tone under these conditions will not effect the incoming message record cycle. The caller's speech will be recorded normally (with perhaps 1400-cycle tone at very low level in the background); the time-out circuits will remain fully energized. The talk-down tone will remain until the caller's voice level rises above —35 v.u. The differential in speech level for the operation of the time-out and talk-down tone circuits (VOC1 and VOC1A respectively) is provided because it is felt that the talk-down tone should advise the caller to speak louder before his speech level has dropped sufficiently to start the time-out cycle. Resistor 3R22 determines the operating point of the talk-down tone circuits. If the shaft of potentiometer 3R22 is turned to the maximum clockwise position, talk-down tone will appear at the same time the time-out cycle starts; VOC1 and VOC1A will both release when the speech level at terminals T and R drops below —45 v.u. If the caller's speech level drops below —45 v.u. at terminals T and R, relay 3VOC1 will also release. Two seconds later relay 3VOC2 releases. The CU time-out cycle commences. The IMR is notified by circuit opening MG and circuit closure MF. Reappearance of speech of adequate level on the telephone line, will cancel the time-out sequence and will remove the talk-down tone from the line. The appearance of talk-down tone is delayed two seconds after speech stops, for a very definite reason. It is felt that an immediate appearance of tone would have an adverse psychological effect upon the caller.

Since the operate and release condition of the CU time-out relay 3VOC2 is relayed to the IMR, the IMR can start and stop its recording medium in step with the absence and presence of speech (or speech of adequate level, above —45 v.u.) on the telephone line. By following this procedure, the IMR may be able to conserve a substantial amount of recording material and at the same time eliminate "dead" spaces in the medium which may be annoying to the subscriber or transcriber during subsequent playback of the recorded medium. The usefulness of the start-stop technique will increase with the length of individual incoming messages since then it becomes natural to pause more frequently. Because the CU cannot anticipate the resumption of speech after a long pause (longer than two seconds) and the response time of the voice-operated control circuits is appreciable (about 100 milliseconds), speech clipping will occur unless the IMR has provisions for "delayed" recording. If the time required for the caller's speech to travel from the input terminals (A and B) to the recording medium is greater than 100 milliseconds, say 150 milliseconds, then the motion of the medium could be controlled by relay 3VOC2. Relay 3VOC2 will not operate until 50 milliseconds after speech has appeared at terminals T and R but the speech will not reach the recording medium until 50 milliseconds later—allowing 50 milliseconds for the necessary IMR control switching and for the medium to reach operating speed. Clipping of part of the caller's first word as he resumes talking will thereby be avoided.

The caller has now finished his message and hangs up. If hang-up is accompanied by an interruption in telephone line current (such as would occur in a step-by-step area), relay 1CPC releases. Relay 4ST releases about 10 milliseconds later. The IMR stops recording; the incoming message record cycle ends; the IMR and CU resume the answer and record standby condition, ready to accept another call.

If caller hang-up is not accompanied by a current interruption or if he ceases speaking, the CU starts to time out. The complete time-out sequence is as follows:

*a.* 50 milliseconds or so after speech stops, relays 3VOC1 and 3VOC1A release.

*b.* Two seconds later relays 3VOC2 and 3VOC2A release.

*c.* Talk-down tone appears.

*d.* Eight seconds later relay 3VOC3 releases and contact 3(3VOC3)4 closes.

*e.* Relays 3A and 3B start to function as a pulse generator. Relay 3A operates and releases at about a ½ second rate. Operated contact 1(3A)2 of relay 3A energizes the tone oscillator. Voltage is supplied over the path including operated contact 1(4ST)3 of relay 4ST, closed contacts 1(2BI)1 of relay 2BI, 1(2AO)1, 1(3VOC6)1 and 1(3IMR2)1 of relay 3IMR2, closed contact 1(4PST)2, operated contact 1(3VOC4)1 of relay 3VOC4, resistor 1R6, and network 1Z1. The tone oscillator generates 1400-cycle disconnect beeps (about ½ second on, ½ second off). The beeps appear at terminals T and R at about —5 v.u. Talk-down tone is not disabled during the interval between successive beeps. The interval between successive beeps has been made a minimum of 300 milliseconds by choosing relays 3A and 3B with proper operate and release times. A minimum of 300 milliseconds is required to allow certain types of echo suppressors on toll loops to unlock. Unless the echo suppressors are given time to unlock, the caller cannot recapture control (interrupt the time-out cycle) during transmission of the disconnect beeps.

*f.* Five seconds after 3VOC3 is released, 3VOC4 releases; a disconnect beeps stop; relays 3A and 3B are deenergized. Talk-down tone continues over the path including closed contacts 1(3IMR2)2, 1(3A)1 and 1(3VOC2A)1.

*g.* Relay 3VOC4 contact 4(3VOC4)1 across 4R33 and 4C24 opens. Capacitor 4C24 starts to charge through relay 4ST winding; relay 4ST remains operated. In about two seconds, the charging current drops to a value low enough for relay 4ST to release.

*h.* Release of relay 4ST terminates the incoming message record cycle. Simultaneously: talk-down tone stops; telephone line current through relay 1CPC stops, holding termination on the telephone line is removed; the IMR start-disconnect circuit (E–M) is opened. The IMR and CU resume the answer and record ready condition.

*IMR voice and record medium motion alarm*

The voice-operated control section contains a relay which has not been mentioned in the description above, the 3VOC5 (IMR Voice and Record Medium Motion Alarm) relay. This relay is provided to enable the IMR to stop the incoming message record cycle in the event of failure of the IMR record speech circuits or failure in the record medium drive mechanism. When trouble occurs in the IMR, a contact closure to ground at terminal P operates relay 3VOC5 and holds it operated. Operation of relay 3VOC5 releases relay 3IMR1A to close contacts 3(3IMR1A)1 and 1(3IMR1A)1, to operate relay 3A and to close contact 1(3A)2 and thereby initiate the CU time-out sequence consisting of seventeen seconds of disconnect beeps which the caller cannot talk down. After time out, the system will go into a "don't answer" condition until the trouble is corrected and relay 3VOC5 is released.

The chance of failure of the IMR record medium drive system is perhaps greatest at the start of the recording cycle. However, since the CU cannot anticipate failure in the IMR, the recording cycle will always be initiated first, then relay 3VOC5 will be allowed to determine whether or not the cycle should continue. It would be possible to arrange the control circuits to delay the start of the recording cycle until relay 3VOC5 gives a go-ahead command, but this procedure is ruled out because it is possible, under certain conditions, to get the system into a locked-out condition for very long periods of time. Relay failure in the IMR could cause the locked-out condition during which the telephone line is seized but no start beep or talk-down tone is transmitted by the CU. Telephone answering set experience has also revealed that some callers do not wait for a start signal but start talking as soon as the announcement has finished. So, unless the same start and time-out procedure is always followed, very unfavorable customer reaction may arise.

Whenever relay 3VOC5 operates during the IMR record cycle, high level disconnect beeps will be transmitted to the caller. The disconnect beeps will continue for the entire, seventeen seconds time-out cycle. The caller's speech cannot recapture control since contacts 3(3VOC5)2 and 3(3VOC5)3 are open and relays 3VOC2 and 3VOC2A are deenergized.

*End of recording medium warning signal*

Another control signal that the IMR provides, is the "End of Recording Medium Warning Signal." The IMR is required to close this circuit by applying ground to terminal S when from fifteen to thirty seconds of recording medium remains. This circuit closure operates relay 3IMR2 in the control unit. The control circuits are so arranged that operation of 3IMR2 closes contacts 3(3IMR2)1 and 1(3IMR2)3 and causes the talk-down tone to be interrupted by pulse generator relay A, at the same rate as the disconnect beeps. The pulsing talk-down tone is distinguished from the disconnect beeps by the difference in level. The disconnect beep will be at least 20 db higher in level.

Pulsing of the talk-down tone will continue until either the caller hangs up or the recording medium is exhausted. The caller's speech will not stop the pulsing talk-down tone since the path for energizing the oscillator includes operated contacts 1(3A)1 and 1(3IMR2)3, and does not include contact 1(3VOC2A)1. It is intended to be a warning to the caller that the recording medium is nearing exhaustion and that he'd better prepare to terminate his message. Once relay 3IMR2 operates, it remains operated until the recording medium is renewed by the customer. All calls to the installation will get a don't answer until relay 3IMR2 is released. The "Don't Answer" Alarm Signal Circuit to the IMR at terminal C will be closed during this interval.

*Subscriber "break in"*

The answering and recording system described herein contains an operating feature that is new to this type of telephone service. The feature is called "break in" for want of a better word. The customer or attendant can interrupt the answering or recording cycle by lifting the handset of a telephone set and depressing a button such as the line pickup button shown in Fig. 2. By doing so he interrupts the cycle in progress and is placed in direct communication with the caller. The subscriber can then give the caller appropriate instructions or take the message manually. If instead, the subscriber wants the incoming message recorder to resume recording the caller's message, he merely depresses and releases the A–R reset and restart button shown in Fig. 2. On lifting the handset switch 2SW closes. On depressing the line pickup button relay 2BI operates and contacts 2(2BI)1 and 2(2BI)2 close. The closure of contact 2(2BI)1 operates relay 4PST. On depressing the reset and restart button ground is supplied over the path including operated contacts 2(2BI)2, 4(3IMR1A)1 and 4(4PST)2, and closed contact 4(4ST)1 to reenergize relay 4ST. An anticipated application of this feature will now be described to illustrate the principles of operation.

A caller has reached the system and is in the process of recording his message. Before he has completed his message, the end of recording medium warning sounds. The subscriber upon hearing or seeing the alarm indication lifts the telephone handset. The telephone set is connected so that he may monitor the telephone line without having to depress any of the telephone set buttons. At an appropriate place in the caller's message, the subscriber depresses the line pickup button. Relay 2BI in the CU operates, contact 4(2BI)2 opens, relay 4ST is deenergized and the IMR is stopped. The voice-operated control circuits and the IMR resume the pre-start, standby condition. In order to prevent recording the conversation, the input speech circuit of the IMR is shorted and grounded. The subscriber tells the caller to hold on while he changes the recording medium. He lays the handset on the desk (not back of its cradle) and proceeds to install new recording material in the IMR. During this time, the caller hears room noise to indicate that the connection is still made. When the new material has been installed, the subscriber returns to the telephone set and tells the caller to resume recording his message. As he speaks the last word, the subscriber depresses the A–R reset and restart button on the telephone set and releases it; the line pickup button is automatically released. As the line pickup button is unlocked, relay 2BI drops out, restoring the record function of the IMR to normal. In the meantime, the momentary operation of the restart button operated the start relay in the CU; the start signal was sent to the IMR. Simultaneously, a single, high level beep is transmitted to the telephone line, at the end of which talk-down tone appears. The caller resumes recording his message.

The subscriber monitors the telephone line after he has depressed the restart button to make certain the caller has understood and followed his instructions. If the caller does not respond properly, the subscriber can "break in" again and repeat his instructions. The "break in" technique may be employed as many times as the subscriber finds it is necessary, without any detrimental effects.

The subscriber has only one precaution to observe. If he hangs up after breaking into the recording cycle without depressing the restart button, relay 4ST will not be reenergized and the CU will drop off the line. Subsequent calls will ring the telephone set bell and will get a "don't answer" unless the subscriber or attendant answers the calls manually.

As noted above relay 2BI operates directly from a contact closure established by locking of the line pickup button on the telephone set. Contacts on 2BI operate prestart relay 4PST; release start relay 4ST; ground the speech input circuits to the IMR; disable the tone generator; enable the restart circuit to start relays 4ST and 4STA; and disconnect the answering set from the line, if "break-in" occurs during the announcement (answering) cycle instead of the IMR incoming message recording cycle (at opened contacts 4(2BI)1 and 4(2BI)3).

The line pickup button is illuminated while it is in the locked position. Voltage is provided to the line pickup lamp over the path including operated contacts 2(2BI)3 and closed contacts 2(2AO)1 and 2(2D)2. If the system is in a ready condition, the CU ready and IMR ready lamps also illuminate when the subscriber lifts the handset. The switch-hook and relay 4PST are used to enable the CU and IMR ready lamps during the time the line pickup button is depressed. Voltage is provided to the CU ready lamp over the path including operated contacts 2(4AA)1, 2(3IMR1A)1 and 2(4PST)1 and closed contacts 2(2AO)1 and 2(2D)2. Voltage is provided to the IMR ready lamp over the path including operated contacts 2(3IMR1)1, closed contacts 2(3VOC5)1, operated contact 2(4PST)1 and closed contacts 2(2AO)1 and 2(2D)2. The subscriber or attendant is thereby continuously aware of the system status during the "break-in" procedure. If, for example, the IMR develops trouble during the time the subscriber is talking to the caller, the IMR ready lamp will extinguish advising him that he cannot restart the record cycle and must therefore inform the caller accordingly. Although the CU ready lamp will extinguish once the IMR record cycle resumes, the line pickup button will remain illuminated during the entire interval the button is depressed. The line pickup lamp is a condition-indicating or warning lamp; the caller will get a "don't answer" during the interval the line pickup button is depressed, even though the CU and IMR ready lamps are on. Consequently, a "don't answer" alarm is established by the CU for the line pickup condition.

The control circuit arrangement in the CU which permits "break-in" also permits the subscriber to originate a call and subsequently initiate the IMR record cycle. He may do this by depressing the line pickup button and dialing the called party's number. When the called party responds, the customer issues the proper instructions and operates the A–R reset and restart button; the called party then records his message. Once two-way communication has been established, the CU will respond to the restart signal in the manner described above for the "break-in" procedure. The CU has no way of determining who originated the call once relay 2BI operates.

*Answer only*

If for some reason the subscriber wants to disable the recording portion of the system but wants the callers to receive appropriate instructions, he sets up the answer only function. He does this simply by recording the appropriate announcement on the answering set and then depressing the answer only button on the telephone set (shown in Fig. 2).

A contact on the answer only button operates relay 2AO in the control unit. Relay 2AO then performs the necessary switching to establish the answer only function. Relay 2AO disables the voice-operated circuits at opened contact 1(2AO)1; opens the operate path of prestart relay 4PST; closes the "Don't Answer" alarm signal circuit to the IMR by operating contact 3(2AO)1. Since the answer only function may be utilized during periods when the IMR is inoperative, contacts of relay 2AO take over the functions of relay 3IMR1A where necessary.

Relay 2AO contact 4(2AO)5 provides a signal path from terminal T to G at the answering set. Each incoming call will thereby ring the telephone set bell while the system is in the answer only condition. Relay 2AO contacts 4(2AO)3 and 4(2AO)4 also by-pass switch 4S1 (CU ringup circuit enabling switch) so that the 2-type set can be used for answer only, exclusively, while the CU ringup circuit is enabled. (Refer to Opitional Ringup Circuit below.)

*Dictate and check*

Operation of the dictate and check button connects the handset to the T1 R1 terminals of the answering set. The dictate relay, 2D, in the CU also operates. The dictate relay performs several functions: it operates contact 2(2D)2 to light the lamp beneath the dictate and check button; breaks the monitor path at opened contact 2(2D)1 of the telephone set to isolate the telephone line from the input circuits (T1 R1) of the answering set. Unless this is done, the subscriber's speech, slightly attenuated, will appear on the telephone line and conversely, speech on the telephone line will find its way to the announcement drum of the answering set. The dictate relay also enables the dictate lamp in the answering set to light at the appropriate time by operating contact 4(2D)3.

The dictate lamp circuit of the answering set is brought to the control unit so that the lamp will not light unless the dictate and check button on the telephone set is depressed. The scheme is employed to guard against trying to dictate without first depressing the dictate and check button.

The circuitry of the CU is arranged to permit the dictating and checking of a new announcement on the answering set while the IMR is recording an incoming message. This technique was thought to be desirable since the incoming message may be of long duration and the customer may not want to interrupt the record cycle to change the announcement nor want to wait an indeterminate interval of time for the record cycle to end.

The subscriber may dictate an announcement during the record cycle of the IMR but once the record cycle terminates, all subsequent calls will get a "don't answer" until the dictate and check button is unlocked, by depressing and releasing the A–R reset and restart button. During the time the dictate and check button is locked, the telephone set ringer will sound with each incoming call; the "don't answer" alarm signal circuit to the IMR will be closed; the dictate and check button will remain illuminated.

*Optional ringup circuit*

Relays 4RU and 4LSD are included in the control unit to provide an independent ringup circuit in the event the subscriber does not want or need an announcement to precede the IMR record cycle. By operating 4S1, the CU ringup circuit enabling switch, the system can be made independent of the answering set.

An incoming call will operate relay 4RU, which enables the operate path of relay 4LSD. The operate path for relay 4RU includes conductor R, switch 4S1, capacitor 4C25, thermistor 4RT1, winding of relay 4RU, closed contact 4(3IMR2)1, operated contact 4(3IMR1A)1, closed contact 4(2AO)6, operated contact 4(4AA)3, closed contact 4(3VOC5)1, switch 4S1, closed contacts 4(2BI)3 and 4(2D)2 and conductor T. Relay 4LSD which is energized by the operation of contact 4(4RU)1 has a time delay of about 1¼ seconds. The telephone line is seized about 1¼ seconds after ringing starts; the start beep and talk-down tone are placed on the line after which the caller commences his message, without instructions. Once the line has been seized, by operation of relay 1CPC, the ringup relay 4RU and the line seizure delay relay 4LSD drop out. Since 20-cycle current is necessary to operate 4RU again, the ringup circuit will remain dormant until the call is released and another is received.

Relay 4RU operates the pre-start relay 4PST by operating contact 4(4RU)2. The pre-start interval is a little longer (about ½ second) than the time delay of relay 4LSD. Relay 4LSD operates contact 4(4LSD)1 to operate the start relays 4ST and 4STA, after which relay 1CPC seizes the line and releases 4RU and 4LSD from further control activity.

The CU circuits are arranged so that an answering set may be left connected to the CU even though the ringup circuit of the CU is being used. The answering set can then be used for answer only service exclusively and not to introduce the incoming message record cycle. The CU ringup circuit enabling switch 4S1 disables the answering set disconnect delay circuit at contact 4 of switch 4S1 and removes the telephone line from the answering set at contacts 4(2AO)3 and 4(2AO)4. Except for the omission of the announcement the system will display all of the features described herein and will operate as described when the optional ringup circuit of the CU is used in place of the answering set.

*Pulse-start operation*

Intermittent shorting of terminals 4R and 4B will pulse-start the telephone answering set or the optional ringup circuit. Closure at these terminals may be accomplished manually or in response to means such as a key telephone set system which may, in turn, be energized by ringing current.

With switch 4S1 in the position shown, relays of the telephone answering set will respond to ground at terminal 1 provided over the path which includes terminals 4B and 4R, operated contact 4(4AA)4, and switch 4S1. With switch 4S1 operated, relay 4RU will be operated by power supplied over the path which includes terminals 4B and 4R, operated contact 4(4AA)4, closed contact 4(2AO)7, switch 4S1, closed contact 4(1CPC)3, winding of relay 4RU, resistor 4R35 and conductor 10.

*Talk back feature*

The essential characteristic of the talk-back feature is the transmission of the last few seconds of the recorded message back to the caller during the IMR recording cycle. Talk-back could serve both as a disconnect warning (in lieu of or supplementing the disconnect beep tones) and as a memory jogger.

The answering and recording system employing the talk-back feature would function in the following manner:

(1) The caller reaches the equipmet as described in previous sections; the IMR recording cycle proceeds normally.

(2) The caller pauses for about two seconds; talk-down tone is placed on the telephone line by the CU.

(3) Caller continues to pause; talk-down tone persists for approximately eight seconds, at the end of which the IMR receives a signal from the CU. It switches from the record to the reproduce function and back spaces the reproduce transducer on the recording medium. When the IMR has done this, it signals the CU which performs appropriate switching of the speech and control circuits.

(4) The last five or six seconds of the caller's recorded message is then played back to him at the end of which talk-down tone reappears.

(5) Caller resumes dictating the remainder of his message.

This procedure will be followed every time the caller pauses for more than ten seconds. However, to avoid the loss of time-out control, the control circuits will permit only one talk-back cycle for each ten-second pause. If the caller does not resume speaking after talk-back has been completed, the CU will go through a time-out sequence of talk-down tone, disconnect beeps, and telephone line release.

The IMR talk-back feature will function as follows:

(1) Caller has reached the equipment and is in process of making a recording. He pauses for about two seconds; contact 1(3VOC2A)1 closes and places talk-down tone on the telephone line. The IMR stops motion of recording medium by utilizing the signal provided by the CU on circuit FM or GM of the interconnecting cable.

(2) The caller does not talk for another eight seconds or so. Relay 3VOC3 releases. Release of relay 3VOC3 closes contact 3(3VOC3)3 and connects the CU (ten seconds) disconnect warning signal circuit at terminal T to the IMR control circuit common at terminal M through operated contacts 3(3VOC4)2 and 3(4ST)6. The IMR recognizes this signal and switches from the record to reproduce function, backspacing the reproduce head at the same time.

(3) As the IMR establishes the reproduce function, it closes the circuit between terminal L (IMR talk-back control circuit) and terminal N (CU control circuit common). Relay 3VOC6 in the control unit operates.

(4) Operation of relay 3VOC6 enables the IMR talk-back speech to reach the telephone line through transformer IT1 by way of circuit J and K of the interconnecting cable. The last five or six seconds of the caller's message is transmitted to him.

(5) Operation of relay 3VOC6 disables the voice-operated control section of the CU; relays 3VOC1, 3VOC2 and 3VOC3 remain in a non-operated condition; the talk-back speech does not operate them. Relay 3VOC4 is prevented from releasing by operated contact 3(3VOC6)1 of relay 3VOC6. Talk-down tone and disconnect beeps are also disabled by opened contact 1(3VOC6)1 of relay 3VOC6 in the power supply lead to the tone oscillator.

(6) After talk-back has been completed, the IMR opens the circuit between terminals L and N and relay 3VOC6 releases. Talk-down tone is immediately placed on the telephone line; the voice-operated control circuits are enabled.

(7) If the caller speaks, the talk-down tone ceases; the record cycle continues in the normal manner. If the caller does not speak after talk-back is completed, talk-down tone will continue for four to five seconds, the release time of relay 3VOC4. When relay 3VOC4 releases, the pulse generator and tone generator are enabled; the disconnect beeps are placed on the telephone line. The disconnect beeps will continue for about two seconds, the release time of relay 4ST. Release of relay 4ST releases relay ICPC; the telephone line is dropped. The IMR record cycle is terminated.

When the talk-back feature is provided, the CU time-out cycle consists of the following sequence:

1. Two seconds—no speech, no talk-down tone,
2. Eight seconds—talk-down tone,
3. Six seconds—IMR talk-back speech,
4. Five seconds—talk-down tone,
5. Two seconds—disconnect beeps,
6. Telephone line release.

This procedure will also be followed if the caller disconnects since the CU cannot distinguish between lack of speech on the telephone line due to caller pause or caller disconnect, unless caller disconnect is accompanied by an interruption of telephone line current. In cases where disconnect causes an interruption in telephone line current, relay ICPC will release immediately and the IMR record cycle will end without transmission of talk-down tone, talk-back speech or disconnect beeps.

The caller may interrupt the time-out cycle at any time and establish normal recording conditions except during the talk-back transmission and during transmission of the disconnect beeps. Recapture is permitted, however, during the 300-millisecond (minimum) pause between successive beeps.

*Automatic setting of the time-out level*

The sensitivity of the voice-operated control circuits is adjusted by setting resistor 3R18, so that an incoming voice level, at terminal T and R of the control unit, of −45 v.u. would just keep the IMR operating. A lower level would stop the IMR and allow the CU to start the seventeen seconds time-out cycle. With the −45 v.u. adjustment, room noise at the caller's location could easily keep the IMR operating even though the caller is not speaking. Full utilization of the IMR start-stop technique cannot, therefore, be realized unless the sensitivity of the voice-operated control circuits is varied automatically to compensate for the effects of high room noise. When room noise is high, the speech level at which the time-out cycle stops would be increased. Room noise is then less likely to start motion of the IMR recording medium or stop the CU time-out cycle.

Room noise could be defined as all audio frequencies which vary in amplitude (the circuit will not respond to steady state noise signals) except the voice of the caller. Even incidental conversations in the vicinity of the caller could come under the category of noise as well as the usual oscillating fan, office equipment noise and the like. It would therefore be difficult for the voice-operated circuits of the CU to distinguish between non-steady state noise and low-level speech of the caller.

A way of getting around this difficulty is to switch the IMR start-stop and CU time-out level on the basis of the amplitude of the caller's speech at the control unit terminals. If the incoming connection is good and the caller's speech level is high, the start-stop and time-out level can be raised 10 db or so, thereby reducing the effects of room noise by at least a like amount. Relay 3VOC7, 3R41 and 3C27 are added to the voice-operated control section. Capacitor 3C27 makes relay 3VOC7 slow operate. Resistor 3R41 reduces the gain of the transistor amplifier by about 10 db.

If the caller's speech during the incoming message recording cycle is below −25 v.u., relay 3VOC7 does not operate; the IMR start-stop and CU time-out level remains −45 v.u. If the speech exceeds −25 v.u. for two to five seconds, relay 3VOC7 operates and locks up on its own contacts. Operation of relay 3VOC7 introduces a loss of 10 db or so in the transistor amplifier (normally closed contact 3(3VOC7)2 of relay 3VOC7 across 3R41 opens; 10 db of degeneration is introduced), which increases the start-stop and time-out level to −35 v.u. At the same time, the speech level at which the talk-down tone appears will be raised from −35 v.u. to −25 v.u. For the remainder of the incoming message, the caller will have to talk about −25 v.u. to talk down the tone and above −35 v.u. to keep the IMR operating. After the call is terminated, contact 1(4ST)3 of relay 4ST opens the lockup path of 3VOC7 which then releases and restores the voice-operated circuits to normal.

It is to be understood that the above-described arrangements are illustrative of the application of the principles of the invention. Other arrangements may be devised by those skilled in the art without departing from the spirit and scope of the invention.

What is claimed is:

1. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, means responsive to said syllabic frequencies when the level thereof is below a predetermined amplitude for a predetermined time interval for stopping the operation of said recorder.

2. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, means responsive to said syllabic frequencies when the level thereof is below a predetermined amplitude for stopping the operation of said recorder after a first predetermined time interval and disconnecting said recorder from said line after a second predetermined time interval.

3. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, means responsive to said syllabic frequencies when the level thereof falls below a predetermined amplitude for stopping the operation of said recorder after a first predetermined time interval and disconnecting said recorder from said line after a second predetermined time interval, means responsive to said syllabic frequencies when the level thereof rises to at least said predetermined amplitude, prior to the expiration of said second predetermined time interval, for restarting the operation of said recorder.

4. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, means responsive to the interruption of transmission of said syllabic frequencies for a predetermined time interval for stopping the operation of said recorder.

5. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, means responsive to the interruption of transmission of said syllabic frequencies for stopping the operation of said recorder after a first predetermined time interval and disconnecting said recorder from said line after a second predetermined time interval.

6. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, means responsive to the interruption of transmission of said syllabic frequencies for stopping the operation of said recorder after a first predetermined time interval and disconnecting said recorder from said line after a second predetermined time interval, means responsive to the restoration of transmission of said syllabic frequencies, prior to the expiration of said second predetermined time interval, for restarting the operation of said recorder.

7. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, a signal tone generator coupled to said line for transmitting an audible signal thereover, and means energized by said syllabic frequencies when the level thereof is above a predetermined amplitude for rendering said generator inoperative to transmit said signal.

8. In a signal system comprising a line, a signal tone generator and a voice-operated control means, means for coupling said generator to said line, means for coupling said voice-operated control means to said line, means for transmitting speech over said line, said voice-operated control means comprising a frequency filter, said filter including means for passing subaudio frequencies corresponding to the syllabic modulation of said speech and suppressing all audio frequencies, means responsive to said syllabic frequencies when the level thereof is below a predetermined amplitude for rendering said generator operative to transmit a signal tone over said line.

9. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, a signal tone generator coupled to said line for transmitting an audible signal thereover, and means responsive to the interruption of transmission of said syllabic frequencies for rendering said generator operative to transmit said signal.

10. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, a signal tone generator coupled to said line for transmitting an audible signal thereover, means responsive to the interruption of transmission of said syllabic frequencies for stopping the operation of said recorder and rendering said generator operative to transmit said signal after a first predetermined time interval and disconnecting said signal tone generator and recorder from said line after a second predetermined time interval.

11. A signal system in accordance with claim 10 including means responsive to the restoration of transmission of said syllabic frequencies, prior to the expiration of said second predetermined time interval, for restarting the operation of said recorder.

12. In a signal system comprising a line, a voice recorder and means for connecting said line to said recorder and starting the operation thereof to record speech transmitted over said line, a frequency filter coupled to said line, said filter including means for passing subaudio frequencies corresponding to the syllabic modulation of said speech and suppressing all audio frequencies, a signal tone generator coupled to said line for transmitting an audible signal thereover, means responsive to said syllabic frequencies when the level thereof falls below a predetermined amplitude for stopping the operation of said recorder and rendering said generator operative to transmit said signal and, after a predetermined time interval, disconnecting said signal tone generator and recorder from said line.

13. A signal system in accordance with claim 12 including means responsive to said syllabic frequencies when the level thereof rises to at least said predetermined amplitude, prior to the expiration of said predetermined time interval, for restarting the operation of said recorder.

14. An automatic telephone message recording system comprising a telephone line, a recorder, means for connecting said telephone line to said recorder and starting the operation thereof to record a message transmitted over said line, a frequency filter coupled to said line, said filter including means for passing subaudio frequencies corresponding to the syllabic modulation of said message and suppressing all audio frequencies, a signal tone generator coupled to said line for transmitting an audible signal thereover, means responsive to said syllabic frequencies when the level thereof falls below a first predetermined amplitude for rendering said generator operative to transmit said signal, means responsive to said syllabic frequencies when the level thereof falls below a second predetermined amplitude for stopping the operation of said recorder.

15. An automatic telephone message recording system comprising a telephone line, a recorder, means for connecting said telephone line to said recorder and starting the operation thereof to record a message transmitted over said line, a frequency filter coupled to said line, said filter including means for passing subaudio frequencies corresponding to the syllabic modulation of said message and suppressing all audio frequencies, a signal tone generator coupled to said line for transmitting an audible signal thereover, means responsive to said syllabic frequencies when the level thereof falls below a first predetermined amplitude for rendering said generator operative to transmit said signal, means responsive to said syllabic frequencies when the level thereof falls below a second predetermined amplitude for stopping the operation of said recorder and, after a predetermined time interval, disconnecting said signal tone generator and recorder from said line.

16. A signal system in accordance with claim 15 including means responsive to said syllabic frequencies when the level thereof rises to at least said second predetermined amplitude, prior to the expiration of said predetermined time interval, for restarting the operation of said recorder.

17. In a signal system comprising a line, a signal tone generator, a voice recorder, a voice-operated control means and input terminals for said line, a first transformer for coupling said recorder and said voice-operated control means to said line, a second transformer disposed between said first transformer and said terminals for coupling said generator to said line, means for transmitting speech over said line, said voice-operated control means comprising a frequency filter, said filter including means for passing subaudio frequencies corresponding to the syllabic modulation of said speech and suppressing all audio frequencies, means responsive to said syllabic frequencies when the level thereof is below a predetermined amplitude for rendering said generator operative to transmit a signal tone over said line, an impedance network tuned to said tone disposed between said first and second transformers for attenuating the level of said signal tone transmitted to said recorder.

18. In a signal system comprising a line, a signal tone generator, a voice recorder, a voice-operated control means and input terminals for said line, a first transformer for coupling said recorder and said voice-operated control means to said line, a second transformer disposed between said first transformer and said terminals for coupling said generator to said line, means for transmitting speech over said line, said voice-operated control means comprising a frequency filter, said filter including means for passing subaudio frequencies corresponding to the syllabic modulation of said speech and suppressing all audio frequencies, means responsive to said syllabic frequencies when the level thereof is below a first predetermined amplitude for rendering said generator operative to transmit a signal tone over said line, means responsive to said syllabic frequencies when the level thereof is below a second predetermined amplitude for a predetermined time interval for disconnecting said recorder from said line.

19. A signal system in accordance with claim 18 including an impedance network disposed between said first and second transformers for attenuating said signal tone.

20. A signal system in accordance with claim 18 including amplifying means disposed between said first and second transformers for amplifying said speech.

21. In an automatic telephone message recording system comprising a telephone line, a recorder, a voice-operated control means, and a signal tone generator, means responsive to a signal transmitted over said line for coupling said recorder, control means and generator to said line and for conditioning said recorder to record a message transmitted over said line, said voice-operated control means comprising a filter for passing subaudio frequencies corresponding to the syllabic modulation of said message and for suppressing all audio frequencies, means responsive to said syllabic frequencies when the level thereof is below a first-predetermined amplitude for rendering said generator operative to transmit said tone over said line, means responsive to said syllabic frequencies when the level thereof is below a second predetermined amplitude for a predetermined time interval for disconnecting said recorder, control means and generator from said line.

22. In an automatic telephone message recording system comprising a telephone line, a recorder and a voice-operated control means, means responsive to a signal transmitted over said line for coupling said recorder and control means to said line and for conditioning said recorder to record a message transmitted over said line, said voice-operated control means comprising a filter for passing subaudio frequencies corresponding to the syllabic modulation of said message and for suppressing all audio frequencies, control means in said recorder for starting and stopping the operation thereof, said control means being responsive to said syllabic frequencies in such manner as to stop the operation of said recorder for the time interval during which the level of said frequencies is below a predetermined amplitude and to restart the operation of said recorder when the level of said frequencies rises to said predetermined amplitude.

23. In an automatic telephone message recording system comprising a telephone line, a recorder, and a voice-operated control circuit, means for coupling said recorder and control circuit to said line and conditioning said recorder to record a message transmitted over said line, said recorder comprising means for reproducing and playing back said recorded message, said control circuit comprising a filter for passing subaudio frequencies corresponding to the syllabic modulation of said message and suppressing all audio frequencies, means responsive to said syllabic frequencies when the level thereof is below a predetermined amplitude for stopping the operation of said recorder, and, after a predetermined time interval, conditioning said recorder to play back a predetermined portion of said recorded message over said line.

24. In an automatic telephone message recording system comprising a telephone line, a recorder, a voice-operated control circuit and a signal tone generator, means for coupling said recorder, control circuit and generator to said line and conditioning said recorder to record a message transmitted over said line, said recorder comprising means for reproducing and playing back said recorded message, said control circuit comprising a filter for passing subaudio frequencies corresponding to the syllabic modulation of said message and suppressing all audio frequencies, means responsive to said syllabic frequencies when the level thereof is below a predetermined amplitude for stopping the operation of said recorder and rendering said generator operative to transmit said tone over said line, and, after a predetermined time interval, conditioning said recorder to play back a predetermined portion of said recorded message over said line and rendering said generator inoperative.

25. In a signal system comprising a line, and a voice-operated control circuit, means for coupling said control circuit to said line, means for transmitting speech over said line, said voice-operated control circuit comprising a filter for passing subaudio frequencies corresponding to the syllabic modulation of said speech and for suppressing all audio frequencies, an amplifier in said control circuit disposed between said line coupling means and said filter, means responsive to said syllabic frequencies when the level thereof is above a predetermined amplitude for reducing the gain of said amplifier.

26. In an automatic telephone message recording system comprising a telephone line, a recorder, a voice-operated control circuit, a signal tone generator and input terminals for said line, first coupling means for coupling said recorder and said control circuit to said line, second coupling means disposed between said first coupling means and said terminals for coupling said generator to said line, means for transmitting a message over said line and conditioning said recorder to record said message, said voice-operated control circuit comprising a filter for passing subaudio frequencies corresponding to the syllabic modulation of said message and suppressing all audio frequencies, an amplifier disposed between said first coupling means and said filter, means responsive to said syllabic frequencies when the level thereof is below a first predetermined amplitude for rendering said generator operative to transmit a signal tone over said line, means responsive to said syllabic frequencies when the level thereof is below a second predetermined amplitude for a predetermined time interval for disconnecting said recorder from said line, means responsive to said syllabic frequencies when the level thereof is above a third predetermined amplitude for reducing the gain of said amplifier.

27. An automatic telephone message recording system in accordance with claim 26 including an impedance network disposed between said first and second coupling means for attenuating the level of said signal tone transmitted to said recorder.

28. An automatic telephone message recording system in accordance with claim 26 including an amplifier disposed between said first and second coupling means for amplifying said message transmitted to said recorder and said voice-operated control circuit.

References Cited in the file of this patent

UNITED STATES PATENTS

| | | |
|---|---|---|
| 2,816,167 | Muller | Dec. 10, 1957 |
| 2,833,860 | Roberts | May 6, 1958 |